United States Patent
Yang et al.

(10) Patent No.: US 11,101,719 B2
(45) Date of Patent: Aug. 24, 2021

(54) METHOD AND APPARATUS FOR DETERMINING MOTOR TEMPERATURE, AND STORAGE MEDIUM

(71) Applicant: Guangzhou Automobile Group Co., Ltd, Guangdong (CN)

(72) Inventors: Bozhi Yang, Sunnyvale, CA (US); Xiaohui Li, Sunnyvale, CA (US); Fei Xiong, Guangzhou (CN); Linpei Zhu, Guangzhou (CN); Xiong Liu, Guangzhou (CN); Jin Shang, Sunnyvale, CA (US)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 348 days.

(21) Appl. No.: 16/158,337

(22) Filed: Oct. 12, 2018

(65) Prior Publication Data
US 2020/0119625 A1    Apr. 16, 2020

(51) Int. Cl.
*G01K 13/00* (2021.01)
*H02K 11/25* (2016.01)
*G01K 13/08* (2006.01)
*H02H 7/085* (2006.01)
*G01K 7/42* (2006.01)
*H02H 7/08* (2006.01)
*B60L 50/10* (2019.01)

(52) U.S. Cl.
CPC ........... *H02K 11/25* (2016.01); *B60L 50/10* (2019.02); *G01K 7/427* (2013.01); *G01K 13/08* (2013.01); *H02H 7/0833* (2013.01); *H02H 7/0852* (2013.01); *B60L 2240/425* (2013.01)

(58) Field of Classification Search
CPC combination set(s) only.
See application file for complete search history.

(56) References Cited

U.S. PATENT DOCUMENTS

2012/0226483 A1* 9/2012 Berry .............. G01K 7/42
   703/2
2014/0210392 A1* 7/2014 Berry .............. H02P 29/60
   318/473

OTHER PUBLICATIONS

Wallscheid et al., "Design and Empirical Identification of a Lumped Parameter Thermal Network for Permanent Magnet Synchronous Motors with Physically Motivated Constraints", 2015 IEEE International Electric Machines & Drives Conference (IEMDC), pp. 1380-1386, 2015. (Year: 2015).*

(Continued)

*Primary Examiner* — Lisa M Caputo
*Assistant Examiner* — Nasir U. Ahmed
(74) *Attorney, Agent, or Firm* — Gang Yu

(57) ABSTRACT

Provided are a method and apparatus for determining motor temperature, and a storage medium. The method includes: obtaining an electromagnetic loss of each node in $\xi$ nodes acquired by decomposing components of a motor, wherein the $\xi$ is a natural number greater than 1, and at least one component in the components of the motor is decomposed into multiple nodes in the $\xi$ nodes; obtaining a thermal resistance between every two nodes in the $\xi$ nodes; and determining a temperature of the motor based on the electromagnetic loss of the each node in the $\xi$ nodes and the thermal resistance between the every two nodes in the $\xi$ nodes.

16 Claims, 6 Drawing Sheets

```
┌──────────────────────────────────────────────────────┐
│ Obtain an electromagnetic loss of each node in ξ     │
│ nodes acquired by decomposing components of a motor, │ ── S202
│ wherein the ξ is a natural number greater than 1,    │
│ and at least one component in the components of the  │
│ motor is decomposed into multiple nodes in the ξ nodes│
└──────────────────────────────────────────────────────┘
                         ↓
┌──────────────────────────────────────────────────────┐
│ Obtain a thermal resistance between every two        │ ── S204
│ nodes in the ξ nodes                                 │
└──────────────────────────────────────────────────────┘
                         ↓
┌──────────────────────────────────────────────────────┐
│ Determine a temperature of the motor based on the    │
│ electromagnetic loss of the each node in the ξ nodes │ ── S206
│ and the thermal resistance between the every two     │
│ nodes in the ξ nodes                                 │
└──────────────────────────────────────────────────────┘
```

(56) References Cited

OTHER PUBLICATIONS

Won et al., Google Translate of Korean Patent application KR101394548B1. (Year: 2014).*

Mingda Liu, "Cooling Design and thermal analysis for dual-stator 6-slot 4-pole flux-switching permanent magnet machine", MS Thesis, University of Wisconsin-Madison, Aug. 2017 (Year: 2017).*

* cited by examiner

METHOD AND APPARATUS FOR DETERMINING MOTOR TEMPERATURE, AND STORAGE MEDIUM

TECHNICAL FIELD

The disclosure relates to the field of motor temperature estimation, and more particularly, to a method and apparatus for determining motor temperature, and a storage medium.

BACKGROUND

In electric motors, precise measurement or prediction of temperature is critical since high temperature will cause magnet demagnetization and copper wire insulation failure. It is therefore highly desired to have a method to know temperature inside electric motor precisely and cost-effectively.

In most current electric motors, temperature sensors, such as thermistor and thermocouples, are placed inside the motor to measure the temperature. For example, in typical electrical motors for electric vehicle (EV) applications, one or two thermistors are placed inside the stator end winding. The issue is that only a limited number of temperature sensors can be placed in production motor, due to the cost and space available. Also, it may be difficult to measure rotor temperature since special methods (e.g., slip ring, infra red thermography, etc) are needed to measure temperature of a high-speed rotating object, such, as motor rotor.

SUMMARY

The following presents a simplified summary in order to provide a basic understanding of some aspects of the disclosure. This summary is not an extensive overview of the disclosure. It is intended neither to identify key or critical element of the disclosure. The following summary merely presents some concepts of the disclosure in a simplified form as a prelude to the description below.

According to one aspect of the embodiments of the disclosure, there is provided a method for determining motor temperature, which includes: an electromagnetic loss of each node in $\xi$ nodes acquired by decomposing components of a motor is obtained, wherein the $\xi$ is a natural number greater than 1, and at least one component in the components of the motor is decomposed into multiple nodes in the $\xi$ nodes; a thermal resistance between every two nodes in the $\xi$ nodes is obtained; and a temperature of the motor is determined based on the electromagnetic loss of the each node in the $\xi$ nodes and the thermal resistance between the every two nodes in the $\xi$ nodes.

According to another aspect of the embodiments of the disclosure, there is further provided an apparatus for determining motor temperature, which includes: a processor, configured to execute a computer executable instruction; and a memory, configured to store the computer executable instruction, and when the computer executable instruction is executed by the processor, the apparatus executes the following acts: an electromagnetic loss of each node in $\xi$ nodes acquired by decomposing components of a motor is obtained, wherein the $\xi$ is a natural number greater than 1, and at least one component in the components of the motor is decomposed into multiple nodes in the $\xi$ nodes; a thermal resistance between every two nodes in the $\xi$ nodes is obtained; and a temperature of the motor is determined based on the electromagnetic loss of the each node in the $\xi$ nodes and the thermal resistance between the every two nodes in the $\xi$ nodes.

According to still another aspect of the embodiments of the disclosure, there is further provided a storage medium; a computer program is stored in the storage medium, wherein the computer program is configured to execute the above-mentioned method for determining motor temperature.

BRIEF DESCRIPTION OF THE DRAWINGS

The drawings described herein are used to provide a further understanding of the disclosure, and constitute a part of the present application. The exemplary embodiments of the disclosure and descriptions thereof are used to explain the disclosure, and do not constitute improper limitations to the disclosure. In the drawing.

DETAILED DESCRIPTION OF THE EMBODIMENTS

Figure 1:
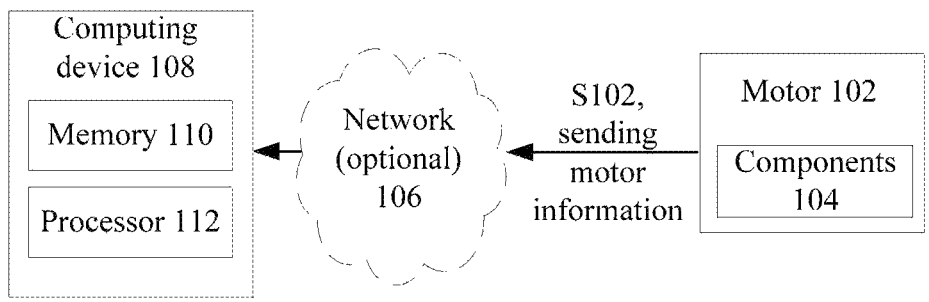
FIG. 1 is a schematic diagram of an application environment of an optional method for determining motor temperature according to an embodiment of the disclosure.

In order to make those skilled in the art better understand the solutions of the disclosure, the technical solutions in the embodiments of the disclosure will be clearly and completely described herein below with reference to the drawings in the embodiments of the disclosure. It is apparent that the described embodiments are only a part of the embodiments of the disclosure, not all of the embodiments. On the basis of the embodiments of the disclosure, all other embodiments obtained on the premise of no creative work of those of ordinary skill in the art shall fall within the scope of protection of the disclosure.

It is to be noted that the specification and claims of the disclosure and terms "first", "second" and the like in the drawings are intended to distinguish similar objects, and do not need to describe a specific sequence or a precedence order. It should be understood that data used in such a way may be exchanged under appropriate conditions, in order that the embodiments of the disclosure described here can be implemented in a sequence except sequences graphically shown or described here. In addition, terms "comprise", "include" and variations thereof are intended to cover non-exclusive inclusions. For example, processes, methods, systems, products or devices containing a series of acts or units do not need to clearly show those acts or units, and may include other inherent acts or units of these processes, methods, products or devices, which are not clearly shown.

Finite element analysis (FEA) methods are sometimes used in a related technology to compute and predict motor temperature field, but FEA method is computationally expensive, thus time consuming. Although the FEA method is accurate, the FEA method is not suitable for real motor control purpose due to its large computation. A lumped parameter thermal network (LPTN) model is also used in a related technology to predict motor temperature field, since the LPTN requires much smaller computation load while captures the heat transfer mechanism. But most reported LPTN model has simple model network and thus lower accuracy. The embodiments of the present disclosure provide a method and apparatus for determining motor temperature, and a storage medium, so as to achieve accurate and fast prediction of motor temperature.

According to one aspect of the embodiments of the disclosure, there is provided a method for determining motor temperature. As an exemplary embodiment, the method for determining motor temperature may be applied, but not limited, to an environment as shown in FIG. 1.

A motor 102 contains components 104. The motor 102 may send motor information to a computing device 108 via the act S102, and the sending process may be implemented via a network 106 or in a direct manner. As an alternative implementation, the computing device 108 may read the motor information from the motor 102. The motor information carries component information of the motor. After obtaining the motor information, the computing device 108 obtains an electromagnetic loss of each node in $\xi$ nodes acquired by decomposing components of the motor, obtains a thermal resistance between every two nodes in the $\xi$ nodes and determines a temperature of the motor according to the electromagnetic loss and the thermal resistance.

In related technologies, in order to determine the temperature of the motor, a temperature measurement device is usually adopted to obtain a temperature of each component in the motor, or employ an LPTN model to simulate the temperature of the motor. However, the above method has the problems that the labor is consumed and the simulation on the temperature of the motor is inaccurate. In this embodiment, since at least one component in the components is decomposed into multiple nodes in the $\xi$ nodes, the temperature of each component may be predicted more accurately, and thus the effect of improving the accuracy to determine the temperature of the motor is achieved.

As an exemplary implementation, the method for determining motor temperature may be applied, but not limited, to a device capable of computing data, for example, terminals such as a mobile phone, a tablet computer, a notebook computer and a PC machine, or a computational processor arranged on a vehicle. The network may include, but not limited to, a wireless network or a wired network. The wireless network includes a Bluetooth, a Wireless Fidelity (WIFI) and other networks implementing wireless communication. The wired network may include, but not limited to, a wide area network, a metropolitan area network and a local area network.

Figure 2:
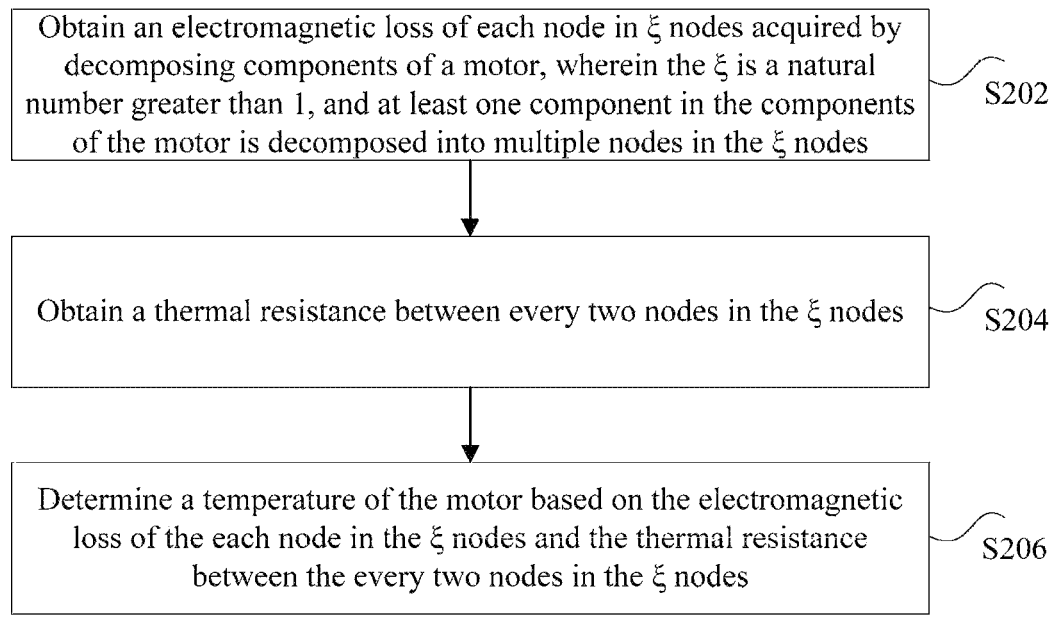
FIG. 2 is a flow diagram of an optional method for determining motor temperature according to an embodiment of the disclosure.

As an exemplary embodiment, as shown in FIG. 2, the method for determining motor temperature may include the following acts.

At S202, an electromagnetic loss of each node in $\xi$ nodes acquired by decomposing components of a motor is obtained, wherein the $\xi$ is a natural number greater than 1, and at least one component in the components of the motor is decomposed into multiple nodes in the $\xi$ nodes.

At S204, a thermal resistance between every two nodes in the $\xi$ nodes is obtained.

At 8206, a temperature of the motor is determined based on the electromagnetic loss of the each node in the $\xi$ nodes and the thermal resistance between the every two nodes in the $\xi$ nodes.

It should be noted that the acts S202 and S204 may be executed at the same time, or in a predefined sequence. For example, the act S202 may be executed prior to the act S204, or the act S204 may be executed prior to the act S202.

As an exemplary implementation, before the electromagnetic loss of the each node in the $\xi$ nodes acquired by decomposing the components of the motor is obtained, at least one component in the motor may be decomposed into, but not limited to, multiple layers, wherein each layer in the multiple layers corresponds to one node.

As an exemplary implementation, the at least one component in the motor may be, but not limited to be, decomposed into the multiple layers in a following manner. The at least one component may be decomposed into the multiple layers according to a material or a form or a function of the at least one component in the motor.

For instance, taking a component made of a metal and a plastic as an example, when the component is decomposed, a metal portion of the component may be decomposed into one layer and a plastic portion of the component may be decomposed into another layer. Alternatively, taking a component composed of a rotary portion and a fixed portion as an example, when the component is decomposed, a rotary portion of the component may be decomposed into one layer and a fixed portion of the component may be decomposed into another layer.

Figure 3:
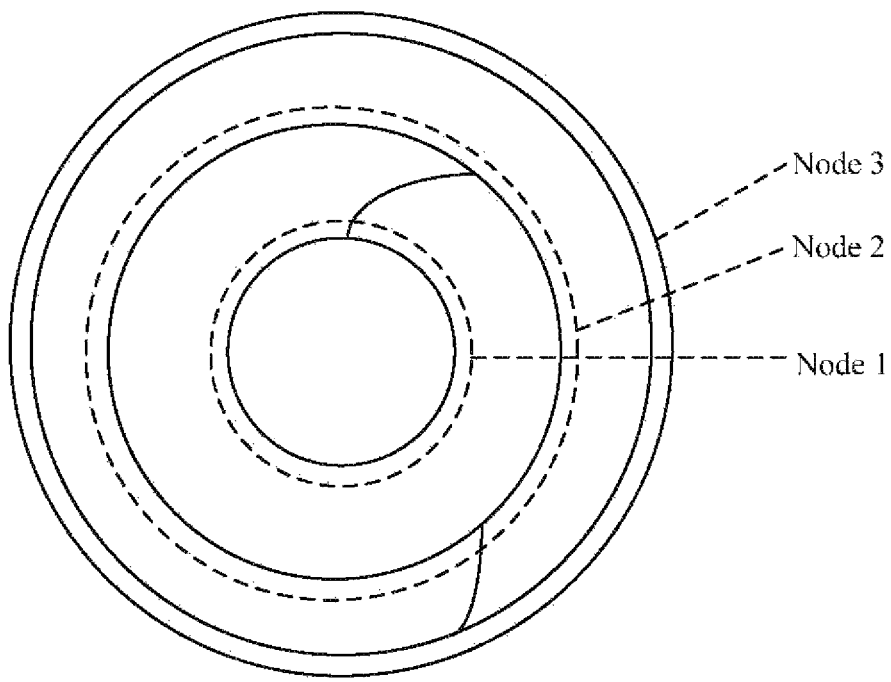
FIG. 3 is a schematic diagram of layering an end winding and decomposing the end winding into multiple nodes according to an embodiment of the disclosure.

As an exemplary implementation, the component may be decomposed into multiple concentric annular layers, or multiple concentric rectangular rings with round corners. Taking an end winding of the motor as an example, as shown in FIG. 3, the cross section of the end winding is of a rectangular shape with round corners (which may be simplified as a circular shape). The end winding is simplified as a multi-layer structure. For example, the end winding may be decomposed into three concentric annular layers, a concentric annular layer encircled by each dashed box is seen as a node and each concentric annular layer is connected with a slot winding. In the example shown in FIG. 3, the end winding is decomposed into three nodes, namely, a node 1, a node 2 and a node 3.

It is to be noted that, the decomposition of the end winding into the three layers is merely an example, and the end winding may be decomposed into any number of layers, for example, the end winding may be decomposed into two layers or more than three layers. The specific number of decomposed layers and the decomposition manner of the nodes may be determined as per a specific condition.

After the end winding is decomposed to multiple nodes, the heat conductivity coefficients of a node material on different directions are different. For example, the end winding is formed by winding many copper wires, the heat conductivity coefficient of the winding on an axial direction is the heat conductivity coefficient of the copper wires, and the heat conductivity coefficients on other directions are obtained by actual measurement. After the end winding is decomposed into multiple layers, the thermal resistance among each layer and the heat conduction between the each layer and the slot winding basically are formed into a thermal-conduction resistance. The heat conductivity coefficient is a key factor which affects the estimation accuracy. Therefore, the effective heat conductivity coefficient on each direction (an axial direction and a radial direction) of the winding is suggested to be accurately measured.

Figure 4:
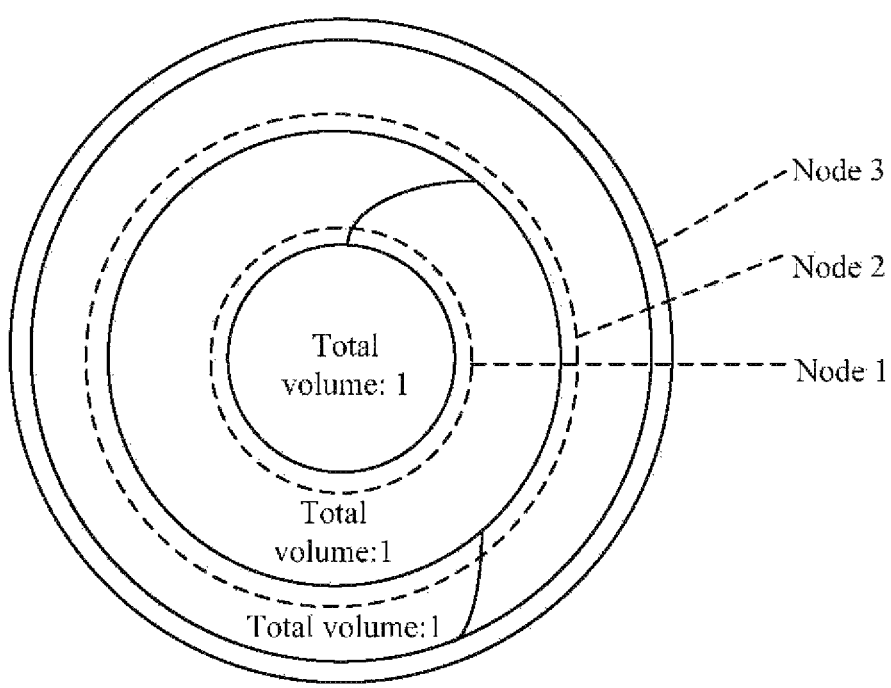
FIG. 4 is a schematic diagram of calculating an electromagnetic loss of each node decomposed from an end winding according to an embodiment of the disclosure.

As an exemplary implementation, after one component is decomposed to obtain the $\xi$ nodes, the electromagnetic loss of the each node in the $\xi$ nodes may be obtained in a following manner. The electromagnetic loss of the each node may be determined according to a proportion of a volume of the each node in a total volume of the component. Taking an end winding, of the motor as an example, the electromagnetic loss of the end winding may be proportional to the volume. The electromagnetic loss of the whole copper wire winding may be obtained by electromagnetic simulation, and the electromagnetic loss of each node in the end winding may be calculated according to a volume proportion of copper wires in the node. For multiple layers, total cross section area of each layer may be comparable to each other, i.e., each outer annular cross area is about equal to the area of the center circular area. In the above-mentioned example, as shown in FIG. 4, the end winding is decomposed into three nodes, and the ratio in a proportion of each node in a total volume is 1:1:1. If the electromagnetic loss is P, the electromagnetic loss of the first node, the second node and the third node is respectively P×1/(1+1+1). Similarly, the area ratio may be about 1:1:1:1 for 4 layers. For the multiple layers, the total cross section area of each layer may not be comparable to each other, for example, the area ratio may be 1:1.5:2.5 or other ratio as needed.

As an exemplary implementation, the electromagnetic loss of the each node in the components of the motor under a predetermined condition may be obtained. The predetermined condition may include a rotor speed of the motor and a torque of the motor. The electromagnetic loss of each component (generally, a heating component is a stator copper wire winding, a stator magnetic steel, a rotor permanent magnet and a rotor magnetic steel) is a function of both RPM and Torque, and may be obtained by electromagnetic simulation (FEA software). Then, according to an FEA result, the corresponding electromagnetic loss of the each component may be calculated approximately. In the FEA, the magnetic steel may be decomposed into several areas corresponding to heating components of a thermal resistance network.

The electromagnetic loss depends on both the rotor speed and the torque. In a condition of the same torque, different rotor speeds of the motor may correspond to different electromagnetic losses. In a condition of the same rotor speed, different torque of the motor may also correspond to different electromagnetic losses.

As an exemplary implementation, after the $\xi$ nodes are obtained, due to different forms of the nodes, the act that the thermal resistance between the every two nodes in the $\xi$ nodes is obtained may include at least one of the followings:

(1) A thermal resistance between two solid nodes (which are basically in contact) in the $\xi$ nodes is obtained based on a conduction thermal resistance calculation manner.

As an exemplary implementation, under a condition in which the first node and the second node are of the same material, the thermal resistance $R_1$ between the two solid nodes in the $\xi$ nodes may be calculated based on one of the following formulae:

for heat conduction through a flat wall, $$R_1 = L/(k \cdot A) \tag{1}$$

where the L is a distance between central points of the first node and the second node, the A is a heat-conduction area between the first node and the second node and the k is a heat conductivity coefficient of the material;

for heat conduction through a cylindrical wall which is more relevant to the electric motor which is largely cylindrical, $$R_1 = \ln(R\_out/R\_in)/(2 \cdot \pi \cdot k \cdot L) \tag{2}$$

where the L is thickness of the cylindrical wall, the k is a heat conductivity coefficient of the material, the R_out and R_in are respectively outer and inner radius of the cylindrical wall.

As another exemplary implementation, under a condition in which the first node and the second node are of different material, the thermal resistance $R_1$ between the two solid nodes in the $\xi$ nodes may be calculated based on one of the following formulae:

for heat conduction through a flat wall, $$R_1 = L_1/(k_1 \cdot A) + L_2/(k_2 \cdot A) + R_3 \tag{3}$$

where $R_3$ is a contact resistance between the first node and the second node, the $L_1$ is a distance between a central point of the first node and a boundary of the first node, the $L_2$ is a distance between a central point of the second node and a boundary of the second node, the A is a heat-conduction area between the first node and the second node, the $k_1$ is a heat conductivity coefficient of the material of the first node, and the $k_2$ is a heat conductivity coefficient of the material of the second node;

for heat conduction through a cylindrical wall which is more relevant to the electric motor which is largely cylindrical, $$R_1 = \ln(R\_out\_1/R\_in\_1)/(2\pi k_1 L_1) + \ln(R\_out\_2/R\_in\_2)/(2\pi k_2 L_2) + R_3 \tag{4}$$

where $R_3$ is a contact resistance between the first node and the second node, the $L_1$ is thickness of the cylindrical wall of the first node, the $L_2$ is thickness of the cylindrical wall of the second node, the $k_1$ is a heat conductivity coefficient of the material of the first node, the $k_2$ is a heat conductivity coefficient of the material of the second node, the R_out 1 and R_in 1 are respectively outer and inner radius of the cylindrical wall of the first node, and the R_out 2 and R_in 2 are respectively outer and inner radius of the cylindrical wall of the second node. The formula 4 is applicable to the calculations for R_16_22, R_18-24, etc, as well as R_50_61, R_51_62, etc, in FIG. 8.

In the above exemplary embodiments, resistance from two adjacent solid nodes usually contains three parts: from center of the first node to the boundary, contact resistance at boundary, from boundary to center of the second node. Resistance between two adjacent nodes is calculated from the center of the first node to the center of the second node. For two nodes of same material, then $R_1$ (L/2)/(k·A)+(L/2)/(k·A)=L/(k·), herein there is no contact resistance. For two nodes of different material, then $R_1=(L/2)/(k_1 \cdot A)+(L/2)/(k_2 \cdot A)+R_3$, herein suppose that, the center of the first node and the center of the second node are of the same distance to the boundary. Herein, the contact resistance between the two nodes can be small or large. If is significant, it is suggested to be included.

In the above exemplary embodiments, the contact resistance between the first node and the second node may be measured by experiments or calculated using the following formula:

$$R_3 = 1/(h_c \cdot A) \tag{5}$$

where the A is the heat-conduction area between the first node and the second node, and the $h_c$ is a heat conductivity coefficient (estimated from Engineering literatures, it is equivalent to k/L).

In practical applications, thermal resistance is suggested to be included for some contact surface, for example, contact resistance between stator lamination and motor housing; contact resistance between rotor lamination and rotor shaft; bearing between rotor shaft and motor end plate can also be treated as an equivalent contact thermal resistance.

As an exemplary implementation, an air gap between a stator and a rotor of the motor is suggested to be treated as a solid with an enhanced thermal conductivity, and the thermal resistance under such a circumstance is calculated based on the conduction thermal resistance calculation manner using the enhanced thermal conductivity k_effective instead of the heat conductivity coefficient k. For the air gap between the stator and the rotor of the motor, the enhanced thermal conductivity k_effective is calculated based on a thermal conductivity enhancement factor (which may be effectively a Nusselt number) and the heat conductivity coefficient k of the air gap, specifically, k_effective=k×Nu. The calculation for the Nu is given below.

The Nusselt number Nu corresponding to the air gap between the stator and the rotor of the motor may be obtained using, but not limited to, the following formula:

$$Nu = \begin{cases} 1, & \text{if } Ta < 1700 \\ 0.064 Ta^{0.367}, & \text{if } 1700 < Ta < 10^4 \\ 0.205 Ta^{0.241}, & \text{if } 10^4 < Ta < 10^6 \end{cases} \tag{6}$$

$$Ta = R_e^2 \frac{\delta}{R_m}$$

$$R_e = \frac{V_r \delta}{v}$$

where the Ta is a Taylor number, the $R_e$ is a Reynolds number, the v is a kinematic viscosity, the $V_r$ is a linear velocity of a rotor outer surface, $V_r = R \cdot \omega$, where R is a radius of the rotor, $\omega$ is an angular speed, and the $R_m$ is a mean radius defined as $$R_m = \frac{b}{\ln((R_i + b)/R_i)},$$

with $b=A/2\pi R_i$, where $R_i$ is an inner radius of an inner annulus. This formula for Nu is based on air gap thickness $\delta$. With that, Nu=1 if Ta<1700, Nu=0.0641a$^{0.367}$ if 1700<Ta<10$^4$, and Nu=0.205Ta$^{0.241}$ if 10$^4$<Ta<10$^6$. Physical meaning of Nu is the effective enhancement factor of air thermal conductivity in the air gap. In this case, when RPM is small, Nu=1, the air gap is exactly treated as a solid air with conductivity k. At higher RPM, Nu is higher than 1, which means h and the k_effective is higher. So Nu is just a linear enhancement factor of thermal.

(2) A thermal resistance between a solid node and a gas node or between a solid node and a liquid node in the $\xi$ nodes is obtained based on a convection thermal resistance calculation manner.

As an exemplary implementation, the thermal resistance between the solid node and the gas node or between a solid node and a liquid node in the $\xi$ nodes is obtained based on the convection thermal resistance calculation manner using, but not limited to, the following formula:

$$R_2 = 1/(h \cdot A) \tag{7}$$

where h is a convective heat transfer coefficient and $h=Nu \cdot k/\delta$, the Nu is a Nusselt number, the k is a heat conductivity coefficient of the fluid, the $\delta$ is a characteristic length, and the A is a heat-conduction area between the solid node and the gas node or between the solid node and the liquid node. The fluid mentioned herein can be liquid or gas, respectively corresponding to the liquid node or the gas node mentioned above, depending on location. Using fluid is more general, good for both cases. For example, gas is inside the two end space and stator-rotor air gap of the motor. But, for coolant channel on the housing water jacket, coolant flows inside the channel. If it is oil cooling motor, the fluid can be oil.

As an exemplary implementation, the Nusselt number corresponding to convection between a balance plate and internal air of the motor may be obtained using, but not limited to, the following formula:

$$N_u = 0.355 \, Re_r^{0.5}, \tag{8}$$

if $Re_r$ is less than $1.82 \times 10^5$, and the flow is laminar $$N_u = 0.015 \, Re_r^{0.8},$$

if $Re_r$ is higher than $2.82 \times 10^5$, and the flow is turbulent $$Re_r = \frac{\omega \cdot r^2}{v}$$

where the $Re_r$ is a Reynolds number, the $\omega$ is an angular speed, the r is a radius of the balance plate and the v is a kinematic viscosity of the internal air.

As an exemplary implementation, a steady-state temperature of the motor may be calculated based on a steady condition. The steady-state temperature is a temperature field observed at an enough long time and corresponds to a condition, at a highest temperature. Alternatively, a transient temperature of the motor may also be calculated based on a transient condition. The transient temperature is used for knowing in advance whether the temperature of the motor will exceed an allowable temperature or not in a period of time, thereby achieving the purposes of providing an early warning and protecting the motor.

(1) For the calculation of the temperature of the motor under a steady state: After the electromagnetic loss of the each node in the $\xi$ nodes and the thermal resistance between the every two nodes in the $\xi$ nodes are obtained, the steady-state temperature of the motor may be calculated via the following formula:

$$T = G^{-1} \cdot P \tag{9}$$

where the T is a $\xi \times 1$ steady-state temperature vector which includes $\xi$ elements respectively representing steady-state temperatures at the ξ nodes, the G is a ξ×ξ thermal conductance matrix, in which an element g(i,j) represents thermal conduction between an $i^{th}$ node and a $j^{th}$ node, and the g(i,j) is determined based on thermal resistance between the $i^{th}$ node and the $j^{th}$ node, for example, the g(i,j) may be a reciprocal of the thermal resistance r(i, j) between the $i^{th}$ node and the $j^{th}$ node, 1≤i≤ξ, 1≤j≤ξ; the $G^{-1}$ is an inverse matrix of the G; and the P is a ξ×1 heat loss vector which includes ξ elements respectively representing electromagnetic losses at the ξ nodes.

(2) For the calculation of the temperature of the motor under a transient state: After the electromagnetic loss of the each node in the ξ nodes and the thermal resistance between the every two nodes in the ξ nodes are obtained, the transient temperature of the motor may be calculated via, but not limited to, the following formula:

$$T_\tau = e^{A\tau}T_0 + \int_0^\tau e^{\tau-t}BPdt \qquad (10)$$

where the $T_\tau$ is a ξ×1 transient temperature vector which includes ξ elements respectively representing transient temperatures at the ξ nodes when a time variable is τ; the $T_0$ is a ξ×1 initial temperature vector which includes ξ elements respectively representing initial temperatures at the ξ nodes; $A=-C^{-1}\cdot G$, $B=C^{-1}$, the C is a ξ×ξ thermal capacitance matrix, the $C^{-1}$ represents an inverse matrix of the C, the G is a ξ×ξ thermal conductance matrix, in which an element g(i,j) represents thermal resistance between an $i^{th}$ node and a $j^{th}$ node, the g(i,j) is determined based on the thermal resistance between the $i^{th}$ node and the $j^{th}$ node, for example, the g(i,j) may be a reciprocal of the thermal resistance r(i, j) between the $i^{th}$ node and the $j^{th}$ node, 1≤i≤ξ, 1≤j≤ξ; and the P is a ξ×1 heat loss vector which includes ξ elements respectively representing electromagnetic losses at the ξ nodes. In this embodiment, τ is actual time variable, so that temperature matrix $T_\tau$ is a function of τ, and t is the variable for integration.

During actual operation of the motor, the thermal capacitance matrix C may be approximately viewed to be constant, i.e., the thermal capacitance matrix C may be considered not to change with the temperature in most conditions (the relatively accurate C may change with the temperature, for each node, C=density*volume*specific heat of the node). The G and the P may change with a working condition. The temperature vector T may also change with a working condition.

As an exemplary implementation, after a current temperature of the motor is determined according to the electromagnetic loss of the each node in the ξ nodes and the thermal resistance between the every two nodes in the ξ nodes, an electromagnetic loss of the each node of the motor under a current temperature may be updated according to the current temperature, and the temperature of the motor may be determined according to the updated electromagnetic loss of the each node and the thermal resistance between the every two nodes.

Figure 5:
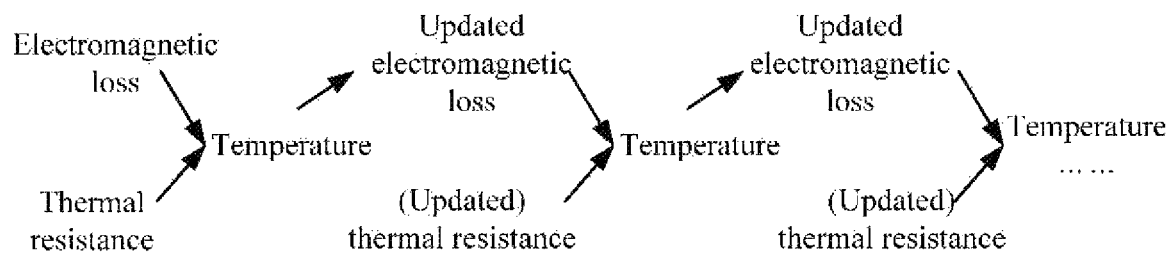
FIG. 5 is a schematic diagram of iteratively calculating a temperature of a motor according to an embodiment of the disclosure.

For example, as shown in FIG. 5, after the temperature of the motor is determined according to the initial electromagnetic loss and the thermal resistance, the electromagnetic loss of each node is updated according to the temperature of the motor, and the temperature of the motor is calculated again, till the temperature of the motor is fluctuated within a certain threshold, that is, the temperature of the motor tends to converge.

As an exemplary implementation, in the process that the components of the motor are decomposed to obtain the ξ nodes, all components in the motor may be decomposed to obtain the ξ nodes; or under a condition in which the structure of the motor is symmetrical or partially symmetrical, components in a first portion of the motor may be decomposed to obtain the ξ nodes, and thus after the temperatures of the ξ nodes are determined, temperatures of nodes of a second portion which symmetrically or partially symmetrically correspond to the components in the first portion may be obtained according to a symmetry principle.

Figure 6:
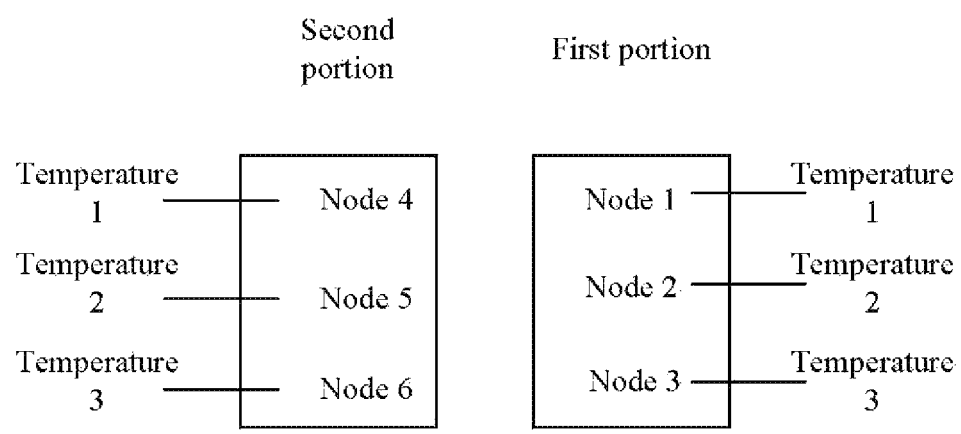
FIG. 6 is a schematic diagram of a method for determining motor temperature using symmetry of a motor according to an embodiment of the disclosure.

For example, as shown in FIG. 6, the first portion includes a node 1, a node 2 and a node 3 and the temperatures of the node 1, node 2 and node 3 respectively are a temperature 1, a temperature 2 and a temperature 3. The second portion includes a node 4, a node 5 and a node 6, which are symmetrical or partially symmetrical to the node 1, the node 2 and the node 3 of the first portion. Hence, the temperatures of the node 4, the node 5 and the node 6 of the second portion may be considered to be approximate to the temperature 1, the temperature 2 and the temperature 3.

Through this embodiment, by decomposing the at least one component into the multiple nodes, the precision of decomposing the components is improved, and thus the accuracy of obtaining the temperature is improved.

It should be noted that, to make the description brief, the foregoing method embodiments are expressed as a series of actions. However, a person skilled in the art should appreciate that the disclosure is not limited to the described action sequence, because according to the disclosure, some acts may be performed in other sequences or performed simultaneously. In addition, a person skilled in the art should also appreciate that all the embodiments described in the specification are preferred embodiments, and the related actions and modules are not necessarily limited to the disclosure.

Through the above description on the embodiments, a person skilled in the art may clearly understand that the method according to the above embodiments may be implemented, by virtue of software and a necessary universal hardware platform, and of course may also be implemented via hardware. But the former is the preferred embodiment in most cases. Based on such an understanding, the essence of the technical solutions of the disclosure or parts making constructions to the conventional art may be embodied in a form of a software product. The computer software product is stored in a storage medium (such as a Read-Only Memory (ROM)/Random-Access Memory (RAM), a magnetic disk and an optical disk), including a plurality of instructions used to enable one terminal device (which may be a mobile phone, a computer, a server or a network device, etc.) to execute the method in each embodiment of the disclosure.

Figure 7:
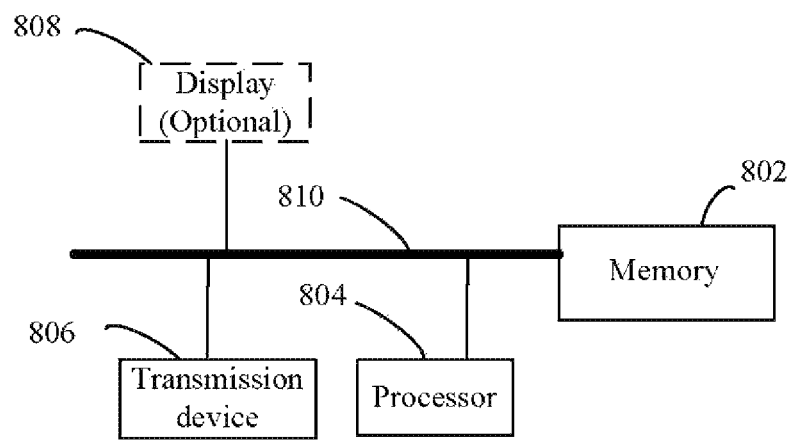
FIG. 7 is a structural schematic diagram of an apparatus for determining motor temperature according to an embodiment of the disclosure.

According to another aspect of the embodiment of the disclosure, an apparatus for determining motor temperature is provided for implementing the above-mentioned method for determining motor temperature. As shown in FIG. 7, the apparatus includes:

a processor 804, configured to execute a computer executable instruction; and a memory 802, configured to store the computer executable instruction; and when the computer executable instruction is executed by the processor, the apparatus executes the following acts.

An electromagnetic loss of each node in ξ nodes acquired by decomposing components of a motor is obtained, wherein the ξ is a natural number greater than 1, and at least one component in the components of the motor is decomposed into multiple nodes in the ξ nodes.

A thermal resistance between every two nodes in the ξ nodes is obtained.

A temperature of the motor is determined based on the electromagnetic loss of the each node in the ξ nodes and the thermal resistance between the every two nodes in the ξ nodes.

It should be noted that the acts S202 and S204 may be executed at the same time, or in a predefined sequence. For example, the act S202 may be executed prior to the act S204, or the act S204 may be executed prior to the act S202.

As an exemplary implementation, before the electromagnetic loss of the each node in the ξ nodes acquired by decomposing the components of the motor is obtained, at least one component in the motor may be decomposed into, but not limited to, multiple layers, wherein each layer in the multiple layers corresponds to one node.

As an exemplary implementation, the at least one component in the motor may be, but not limited to be, decomposed into the multiple layers in a following manner. The at least one component may be decomposed into the multiple layers according to a material or a form or a function of the at least one component in the motor.

For instance, taking a component made of a metal and a plastic as an example, when the component is decomposed, a metal portion of the component may be decomposed into one layer and a plastic portion of the component may be decomposed into another layer. Alternatively, taking a component composed of a rotary portion and a fixed portion as an example, when the component is decomposed, a rotary portion of the component may be decomposed into one layer and a fixed portion of the component may be decomposed into another layer.

As an exemplary implementation, the component may be decomposed into multiple concentric annular layers, or multiple concentric rectangular rings with round corners. Taking an end winding of the motor as an example, as shown in FIG. 3, the cross section of the end winding is of a rectangular shape with round corners (which may be simplified as a circular shape). The end winding is simplified as a multi-layer structure. For example, the end winding may be decomposed into three concentric annular layers, a concentric annular layer encircled by each dashed box is seen as a node and each concentric annular layer is connected with a slot winding. In the example shown in FIG. 3, the end winding is decomposed into three nodes, namely, a node 1, a node 2 and a node 3.

It is to be noted that, the decomposition of the end winding into the three layers is merely an example, and the end winding may be decomposed into any number of layers, for example, the end winding may be decomposed into two layers or more than three layers. The specific number of decomposed layers and the decomposition manner of the nodes may be determined as per a specific condition.

After the end winding is decomposed to multiple nodes, the heat conductivity coefficients of a node material on different directions are different. For example, the end winding is formed by winding, many copper wires, the heat conductivity coefficient of the winding on an axial direction is the heat conductivity coefficient of the copper wires, and the heat conductivity coefficients on other directions are obtained by actual measurement. After the end winding is decomposed into multiple layers, the thermal resistance among each layer and the heat conduction between the each layer and the slot winding basically are formed into a thermal-conduction resistance. The heat conductivity coefficient is a key factor which affects the estimation accuracy. Therefore, the effective heat conductivity coefficient on each direction (an axial direction and a radial direction) of the winding is suggested to be accurately measured.

As an exemplary implementation, after one component is decomposed to obtain the ξ nodes, the electromagnetic loss of the each node in the ξ nodes may be obtained in a following manner. The electromagnetic loss of the each node may be determined according to a proportion of a volume of the each node in a total volume of the component. Taking an end winding of the motor as an example, the electromagnetic loss of the end winding may be proportional to the volume. The electromagnetic loss of the whole copper wire winding may be obtained by electromagnetic simulation, and the electromagnetic loss of each node in the end winding may be calculated according to a volume proportion of copper wires in the node. For multiple layers, total cross section area of each layer may be comparable to each other, i.e., each outer annular cross area is about equal to the area of the center circular area. In the above-mentioned example, as shown in FIG. 4, the end winding is decomposed into three nodes, and the ratio in a proportion of each node in a total volume is 1:1:1. If the electromagnetic loss is P, the electromagnetic loss of the first node, the second node and the third node is respectively P×1/(1+1+1). Similarly, the area ratio may be about 1:1.1:1 for 4 layers. For the multiple layers, the total cross section area of each layer may not be comparable to each other, for example, the area ratio may be 1:1.5:2.5 or other ratio as needed.

As an exemplary implementation, the electromagnetic loss of the each node in the components of the motor under a predetermined condition may be obtained. The predetermined condition may include a rotor speed of the motor and a torque of the motor. The electromagnetic loss of each component (generally, a heating component is a stator copper wire winding, a stator magnetic steel, a rotor permanent magnet and a rotor magnetic steel) is a function of both RPM and Torque, and may be obtained by electromagnetic simulation (FEA software). Then, according to an FEA result, the corresponding electromagnetic loss of the each component may be calculated approximately. In the FEA, the magnetic steel may be decomposed into several areas corresponding to heating components of a thermal resistance network.

The electromagnetic loss depends on both the rotor speed and the torque. In a condition of the same torque, different rotor speeds of the motor may correspond to different electromagnetic losses. In a condition of the same rotor speed, different torque of the motor may also correspond to different electromagnetic losses.

As an exemplary implementation, after the ξ nodes are obtained, due to different forms of the nodes, the act that the thermal resistance between the every two nodes in the ξ nodes is obtained may include at least one of the followings.

(1) A thermal resistance between two solid nodes in the ξ nodes is obtained based on a conduction thermal resistance calculation manner.

As an exemplary implementation, under a condition in which the first node and the second node are of the same material, the thermal resistance $R_1$ between the two solid nodes in the ξ nodes may be calculated based on either of the formula 1 and the formula 2, depending on whether it is heat conduction through a flat wall or a cylindrical wall.

As another exemplary implementation, under a condition in which the first node and the second node are of different material, the thermal resistance $R_1$ between the two solid nodes in the ξ nodes may be calculated based on either of the formula 3 and the formula 4, depending on whether it is heat conduction through a flat wall or a cylindrical wall.

As an exemplary implementation, an air gap between a stator and a rotor of the motor is suggested to be treated as a solid with an enhanced thermal conductivity, and the thermal resistance under such a circumstance is calculated based on the conduction thermal resistance calculation manner using the enhanced thermal conductivity k_effective instead of the heat conductivity coefficient k.

(2) A thermal resistance between a solid node and a gas node or between a solid node and a liquid node in the $\xi$ nodes is obtained based on a convection thermal resistance calculation manner.

As an exemplary implementation, the thermal resistance between the solid node and the gas node or between the solid node and a liquid node in the $\xi$ nodes is obtained based on the convection thermal resistance calculation manner using, but not limited to, the formula 7.

As an exemplary implementation, a steady-state temperature of the motor may be calculated based on a steady condition. The steady-state temperature is a temperature field observed at an enough long time and corresponds to a condition at a highest temperature. Alternatively, a transient temperature of the motor may also be calculated based on a transient condition. The transient temperature is used for knowing in advance whether the temperature of the motor will exceed an allowable temperature or not in a period of time, thereby achieving the purposes of providing an early warning and protecting the motor.

(1) For the calculation of the temperature of the motor under a steady state: After the electromagnetic loss of the each node in the $\xi$ nodes and the thermal resistance between the every two nodes in the $\xi$ nodes are obtained, the steady-state temperature of the motor may be calculated via the above formula 9.

(2) For the calculation of the temperature of the motor under a transient state: After the electromagnetic loss of the each node in the $\xi$ nodes and the thermal resistance between the every two nodes in the $\xi$ nodes are obtained, the transient temperature of the motor may be calculated via, but not limited to, the above formula 10.

As an exemplary implementation, after a current temperature of the motor is determined according to the electromagnetic loss of the each node in the $\xi$ nodes and the thermal resistance between the every two nodes in the $\xi$ nodes, an electromagnetic loss of the each node of the motor under a current temperature may be updated according to the current temperature, and the temperature of the motor may be determined according to the updated electromagnetic loss of the each node and the thermal resistance between the every two nodes.

For example, as shown in FIG. 5, after the temperature of the motor is determined according to the initial electromagnetic loss and the thermal resistance, the electromagnetic loss of each node is updated according to the temperature of the motor, and the temperature of the motor is calculated again, till the temperature of the motor is fluctuated within a certain threshold, that is, the temperature of the motor tends to converge.

As an exemplary implementation, in the process that the components of the motor are decomposed to obtain the $\xi$ nodes, all components in the motor may be decomposed to obtain the $\xi$ nodes; or under a condition in which the structure of the motor is symmetrical or partially symmetrical, components in a first portion of the motor may be decomposed to obtain the $\xi$ nodes, and thus after the temperatures of the $\xi$ nodes are determined, temperatures of nodes of a second portion which symmetrically or partially symmetrically correspond to the components in the first portion may be obtained according to a symmetry principle.

For example, as shown in FIG. 6, the first portion includes a node 1, a node 2 and a node 3 and the temperatures of the node 1, node 2 and node 3 respectively are a temperature 1, a temperature 2 and a temperature 3. The second portion includes a node 4, a node 5 and a node 6, which are symmetrical or partially symmetrical to the node 1, the node 2 and the node 3 of the first portion. Hence, the temperatures of the node 4, the node 5 and the node 6 of the second portion may be considered to be approximate to the temperature 1, the temperature 2 and the temperature 3.

Through this embodiment, by decomposing the at least one component into the multiple nodes, the precision of decomposing the components is improved, and thus the accuracy of obtaining the temperature is improved.

As an exemplary implementation, the memory 802 may further be configured to store a software program and a module, such as a program instruction/module corresponding to the method and apparatus for determining motor temperature in the embodiments of the disclosure. Through running the software program and the module in the memory 802, the processor 802 implements various functional applications and data processing, thereby implementing the method for determining motor temperature. The memory 802 may include a high-speed RAM and may further include a nonvolatile memory, such as one or more magnetic storage devices, flash memories or other non-volatile solid-state memories. In some examples, the memory 802 may further include a memory arranged remotely relative to the processor 804, and the remote memory may be connected to a terminal via a network. An example of the network includes, but not limited to, an Internet, an Intranet, a local area network, a mobile communication network and a combination thereof. Wherein, the memory 802 may be configured, but not limited, to store information such as an electromagnetic loss of each node and a thermal resistance between every two nodes.

As an exemplary implementation, the motor temperature determination device may further include a transmission device 806, a display 808 (which is optional) and a connection bus 810, etc.

As an exemplary implementation, the transmission device 806 is configured to receive or send data via a network or via a direct manner. A specific example of the network may include a wired network and a wireless network. In one example, the transmission device 806 includes a Network Interface Controller (NIC), which may be connected with a router via a network cable and other network devices, thereby communicating with the Internet or the local area network. In one example, the transmission device 806 is a Radio Frequency (RF) module, which is configured to communicate with the Internet via a wireless manner. The display 808 is configured to display the temperature of the motor. The connection bus 810 is configured to connect each modular component in the apparatus for determining motor temperature.

According to still another aspect of the embodiments of the disclosure, there is provided a storage medium. A computer program is stored in the storage medium, wherein the computer program is configured to execute the acts in any of the above method embodiments.

As an exemplary implementation, the storage medium may be configured to store a computer program for executing the following acts.

At S1, an electromagnetic loss of each node in $\xi$ nodes acquired by decomposing components of a motor is obtained, wherein the ξ is a natural number greater than 1, and at least one component in the components of the motor is decomposed into, multiple nodes in the ξ nodes.

At S2, a thermal resistance between every two nodes in the ξ nodes is obtained.

At S3, a temperature of the motor is determined based on the electromagnetic loss of the each node in the ξ nodes and the thermal resistance between the every two nodes in the ξ nodes.

In this embodiment, those of ordinary skill in the art may understand all or partial acts in various methods of the embodiments may be accomplished by enabling a program to direct related hardware of a terminal device. The storage medium may include a flash disk, an ROM, an RAM, a magnetic disk, or an optical disk, etc.

The method for determining motor temperature will be described below with a specific example.

The concept of the embodiment is to create a detailed lumped parameter thermal network model (superior to existing models), which can accurately predict temperature field of an electric motor. We can then use this model to predict motor inner temperature field without using temperature sensors, and to potentially allow model-based motor control. Here we use PMSM as an example. However, the method can be easily adapted to be used to an induction motor with small changes.

Figure 11:
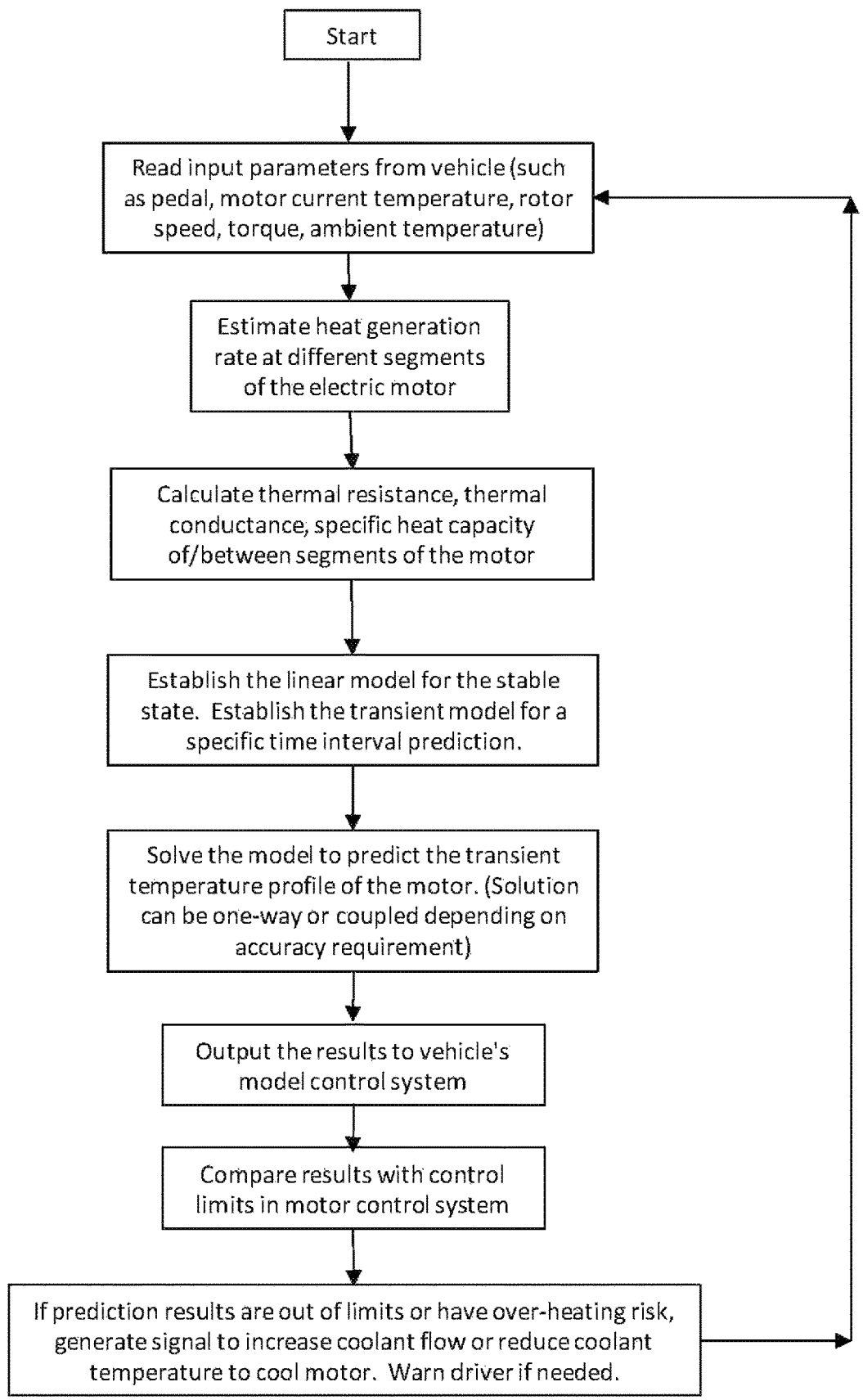
FIG. 11 is a flow diagram of a motor temperature determination and use method according to an embodiment of the disclosure.

Referring to FIG. 11, the method for determining the temperature of the motor may include the following acts.

Firstly, read input parameters from vehicle (such as pedal, motor current temperature, rotor speed, torque, ambient temperature).

Secondly, model the motor's electromagnetic loss (which is also heat generation of each components such as copper wire, laminations, magnet) at different conditions (rotor speed, torque) using FEA software, such as ANSYS Maxwell, JMAG, etc. The loss at different conditions can also be measured by experiments, in which the copper loss was calculated from electric input, and the total motor heat loss was from coolant flow rate and temperature rise. The loss data can be designed into a table for different condition (RPM and torque), so that loss at other conditions can be interpolated. The loss will be used as heat generation in the subsequent CFD, FEA or LPTN modeling.

Thirdly, build a detailed/advanced Lumped Parameter Thermal Network (LPTN) model that decomposes the electric motor into nodes and uses analytical/semi-analytical approach to calculate the thermal resistance between nodes. The nodes in the LPTN model include motor housing, stator iron lamination, slot winding, end turn, housing end plate, rotor shaft, rotor iron lamination, magnet (for permanent magnet motor), rotor balancing plate, internal air, ambient air, gear box, etc. For example, the model may have >50 nodes which represent all the critical parts of a motor.

Figure 8:
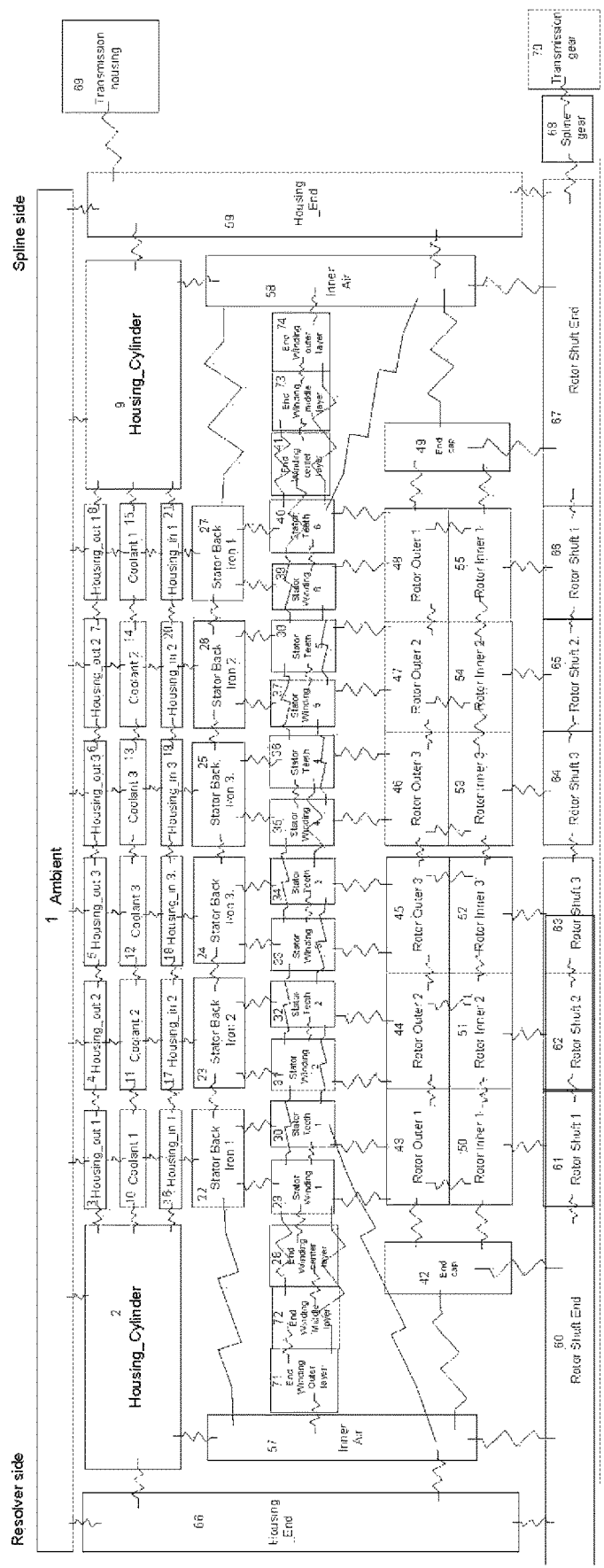
FIG. 8 is a schematic diagram of an LTPN motor model according to an embodiment of the disclosure.

The LPTN model of a PMSM as shown in FIG. 8 is used an example, in which the entire thermal network of the LPTN model consists of 74 nodes. Along axial direction, the stator and rotor were decomposed into 6 units, corresponding to the rotor's 6 individual lamination stacks. The rotor is decomposed into inner and outer layers. The thermal network is solved for the temperatures rise at each node using the matrix equation: G·T=P, where T is a 74×1 temperature vector, G is a 74×74 thermal conductance matrix, and P is a 74×1 vector of heat generation rate of each node. See FIG. 8 and table 1 for the nodal network and the definition of each node.

Figure 9:
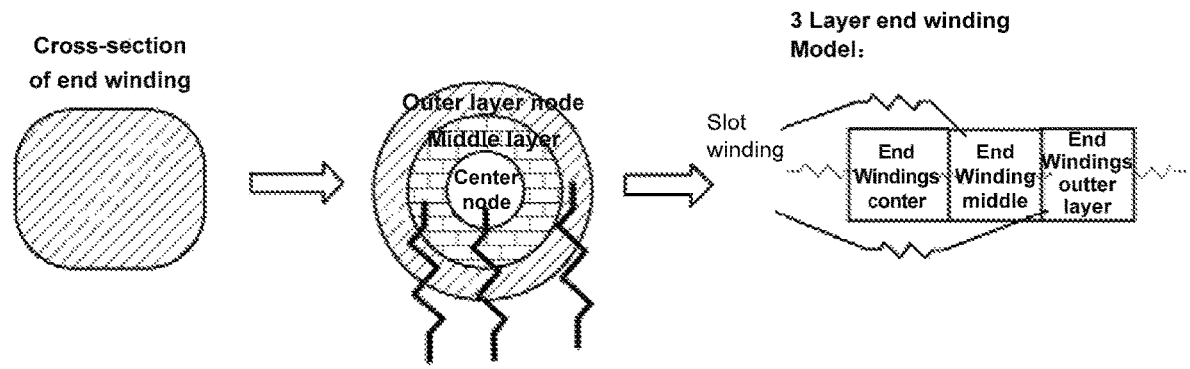
FIG. 9 is a detailed schematic diagram of layering an end winding and decomposing the end winding into multiple nodes according to an embodiment of the disclosure.

As shown in FIG. 9, in this example, 3 nodes were used in each end winding to study the temperature distribution (temperature gradient (ΔT) inside the end winding. Such 3-node representation of end winding is novel and was not seen in other LPTN work. The 3-layer (3 node) representation can be extended to more layers (more nodes) as needed to more accurately capture the temperature field inside the wind winding, using similar node decomposition method.

The thermal resistance between nodes is calculated basing on the heat transfer and thermal fluidics theories. For purely heat conduction resistance between solid nodes, the thermal resistance is calculated from the geometry and material thermal conductivities. For heat transfer between solid node and air node or between solid node and coolant node, the thermal resistance is calculated using the convective heat transfer coefficients estimated from conventional thermo-fluid theory. The air gap between stator and rotor was treated as a solid with an enhanced thermal conductivity that changes with rotor RPM speed, where the Nusselt number is effectively the thermal conductivity enhancement factor. The thermal resistance of bearing and contact resistance (stator lamination-shaft, stator lamination-housing, etc), can, also be defined using the empirical value and theory.

Thermal resistance calculation is as follows:

For conduction thermal resistance:

$$R_1 = L/(k \cdot A) \quad (1)$$

where L is length of, heat conduction length, A is conduction area, k is thermal conductivity of the material. Note L is measured from center of one node to the center of the other node.

One special case is silicon grease between the housing cylinder and end housing. The average thickness and thermal conductivity of cured grease is measured and used to estimate thermal resistance of between the two housings.

An air gap between a stator and a rotor of the motor is suggested to be treated as a solid with an enhanced thermal conductivity, and the thermal resistance under such a circumstance is calculated based on the conduction thermal resistance calculation manner using the enhanced thermal conductivity k_effective instead of the heat conductivity coefficient k. For the air gap between the stator and the rotor of the motor, the enhanced thermal conductivity k_effective is calculated based on a thermal conductivity enhancement factor (which may be effectively a Nusselt number) and the heat conductivity coefficient k of the air gap, specifically, k_effective=k×Nu. The calculation for the Nu is given below.

For the stator-rotor air gap, Nusselt number Nu is calculated by fluid mechanics theory shown below.

$$Nu = \begin{cases} 1, & \text{if } Ta < 1700 \\ 0.064 Ta^{0.367}, & \text{if } 1700 < Ta < 10^4 \\ 0.205 Ta^{0.241}, & \text{if } 10^4 < Ta < 10^6 \end{cases} \quad (6)$$

$$Ta = R_e^2 \frac{\delta}{R_m}$$

$$R_e = \frac{V_r \delta}{\nu}$$

where the Ta is a Taylor number, the $R_e$ is a Reynolds number, the ν is a kinematic viscosity, the $V_r$ is a linear velocity of a rotor outer surface, $V_r$=R·ω, where R is a radius of the rotor, ω is an angular speed, and the $R_m$ is a mean radius defined as $$R_m = \frac{b}{\ln((R_i + b)/R_i)},$$

with $b=A/2\pi R_i$, where $R_i$ is an inner radius of an inner annulus. This formula for Nu is based on air gap thickness $\delta$. With that, Nu=11 if Ta<1700, Nu=$0.064 Ta^{0.367}$ if 1700<Ta<$10^4$, and Nu=$0.205 Ta^{0.241}$ if $10^4$<Ta<$10^6$. Physical meaning of Nu is the effective enhancement factor of air thermal conductivity in the air gap. In this case, when RPM is small, Nu=1, the air gap is exactly treated as a solid air with conductivity k. At higher RPM, Nu is higher than 1, which means h and the k_effective is higher. So Nu is just a linear enhancement factor of thermal.

For convection thermal resistance:

$$R_2 = 1(h \cdot A) \qquad (7)$$

where h is a convective heat transfer coefficient and h=Nu·k/$\delta$, Nu is Nusselt number, k is conductivity of fluid, $\delta$ is characteristic length, for example stator-rotor gap thickness in an electric motor.

If temperature is high, we need to also consider radiation heat transfer.

In fact, heat transfer between different components of the motor can be by several methods, but we need to consider the most important method. For example, sometimes the radiation heat transfer can be ignored at low temperature.

For the convection between the balancing plate and inner air, the Nusselt number is calculated as:

$$N_u = 0.355 \, Re_r^{0.5}, \qquad (8)$$

if $Re_r$ is less than $1.82 \times 10^5$, and the flow is laminar $$N_u = 0.015 \, Re_r^{0.8},$$

if $Re_r$ is higher than $2.82 \times 10^5$, and the flow is turbulent $$Re_r = \frac{\omega \cdot r^2}{\nu}$$

where $Re_r$ is the Reynolds number, $\omega$ is the rotating speed, r is the radius of the plate, and $\nu$ is the kinematic viscosity of the air.

For solid-solid contact surface:

$$R_3 = 1/(h_c \cdot A) \qquad (5)$$

where A is contact surface, $h_c$ is the thermal conductance coefficient (estimated from Engineering literatures, it is equivalent to k/L).

Examples include the contact resistance between motor Al housing (water jacket) and stator out lamination, contact resistance between rotor's balancing plate and rotor lamination, and contact resistance between the rotor lamination and rotor shaft.

TABLE 1

| | Nodes in the example Full-motor LPTN model of a PMSM (FIG. 8) |
|---|---|
| 1 | Ambient |
| 2 | Housing cylinder end resolver side |
| 3 | Housing outer 1 |
| 4 | Housing outer 2 |
| 5 | Housing outer 3 |
| 6 | Housing outer 4 |

TABLE 1-continued

| | Nodes in the example Full-motor LPTN model of a PMSM (FIG. 8) |
|---|---|
| 7 | Housing outer 5 |
| 8 | Housing outer 6 |
| 9 | Housing cylinder end spine side |
| 10 | Coolant 1 inlet |
| 11 | Coolant 2 |
| 12 | Coolant 3 |
| 13 | Coolant 4 |
| 14 | Coolant 5 |
| 15 | Coolant6 outlet |
| 16 | Housing inner 1 |
| 17 | Housing inner 2 |
| 18 | Housing inner 3 |
| 19 | Housing inner 4 |
| 20 | Housing inner 5 |
| 21 | Housing inner 6 |
| 22 | Stator yoke 1__resolver side |
| 23 | Stator yoke 2 |
| 24 | Stator yoke 3 |
| 25 | Stator yoke 4 |
| 26 | Stator yoke 5 |
| 27 | Stator yoke 6__spline side |
| 28 | Stator end winding resolver side inner layer |
| 29 | Stator winding 1__resolver side |
| 30 | Stator teeth__1 resolver side |
| 31 | Stator winding 2 |
| 32 | Stator teeth 2 |
| 33 | Stator winding 3 |
| 34 | Stator teeth 3 |
| 35 | Stator winding 4 |
| 36 | Stator teeth 4 |
| 37 | Stator winding 5 |
| 38 | Stator teeth 5 |
| 39 | Stator winding 6__spline side |
| 40 | Stator teeth 6__spline side |
| 41 | Stator end winding spline side inner layer |
| 42 | End cap resolver side |
| 43 | Rotor outer lamination 1 |
| 44 | Rotor outer lamination 2 |
| 45 | Rotor outer lamination 3 |
| 46 | Rotor outer lamination 4 |
| 47 | Rotor outer lamination 5 |
| 48 | Rotor outer lamination 6 |
| 49 | End cap spline side |
| 50 | Rotor inner lamination 1 |
| 51 | Rotor inner lamination 2 |
| 52 | Rotor inner lamination 3 |
| 53 | Rotor inner lamination 4 |
| 54 | Rotor inner lamination 5 |
| 55 | Rotor inner lamination 6 |
| 56 | Housing End resolver side |
| 57 | Inner air resolver side |
| 58 | Inner air spline side |
| 59 | Housing End spline side |
| 60 | Rotor shaft end resolver side |
| 61 | Rotor shaft 1 |
| 62 | Rotor shaft 2 |
| 63 | Rotor shaft 3 |
| 64 | Rotor shaft 4 |
| 65 | Rotor shaft 5 |
| 66 | Rotor shaft 6 |
| 67 | Rotor shaft end spline side |
| 68 | Spline |
| 69 | gear box housing |
| 70 | gear box axle |
| 71 | End winding resolver side outter layer |
| 72 | End winding resolver side middle layer |
| 73 | End winding spline side middle layer |
| 74 | End winding spline side outter layer |

FIG. 9 shows a Stator end winding model using a multiple-layer representation.

For the stator end winding model, here we use 3-layer model as an example. It may have more layers to capture the temperature gradient inside the end winding. The actual cross section of end, winding is roughly a rectangle with round corner. It is modeled as a circular cross section with three concentric annular layers (center, middle, and outer), where each layer is connected to the stator slot winding. Only the outer layer is connected to inner air node. The middle and center layer are not connected to air.

The thermal resistance between layers is calculated with a thermal conductance formula. The effective thermal conductivity is measured experimentally. The effective thermal conductivity between layers is different from the thermal conductivity along the copper wire. The later is being used in the estimation of thermal resistance between the ending winding and slot winding.

The full LPTN model described above can model the non-symmetric effect of the two sides of the motor, since they motor ends are different. For example, rotor shaft of one side is connected to the gear box, while the other side is not thus having different heat dissipation rate (thermal resistance).

Figure 10:
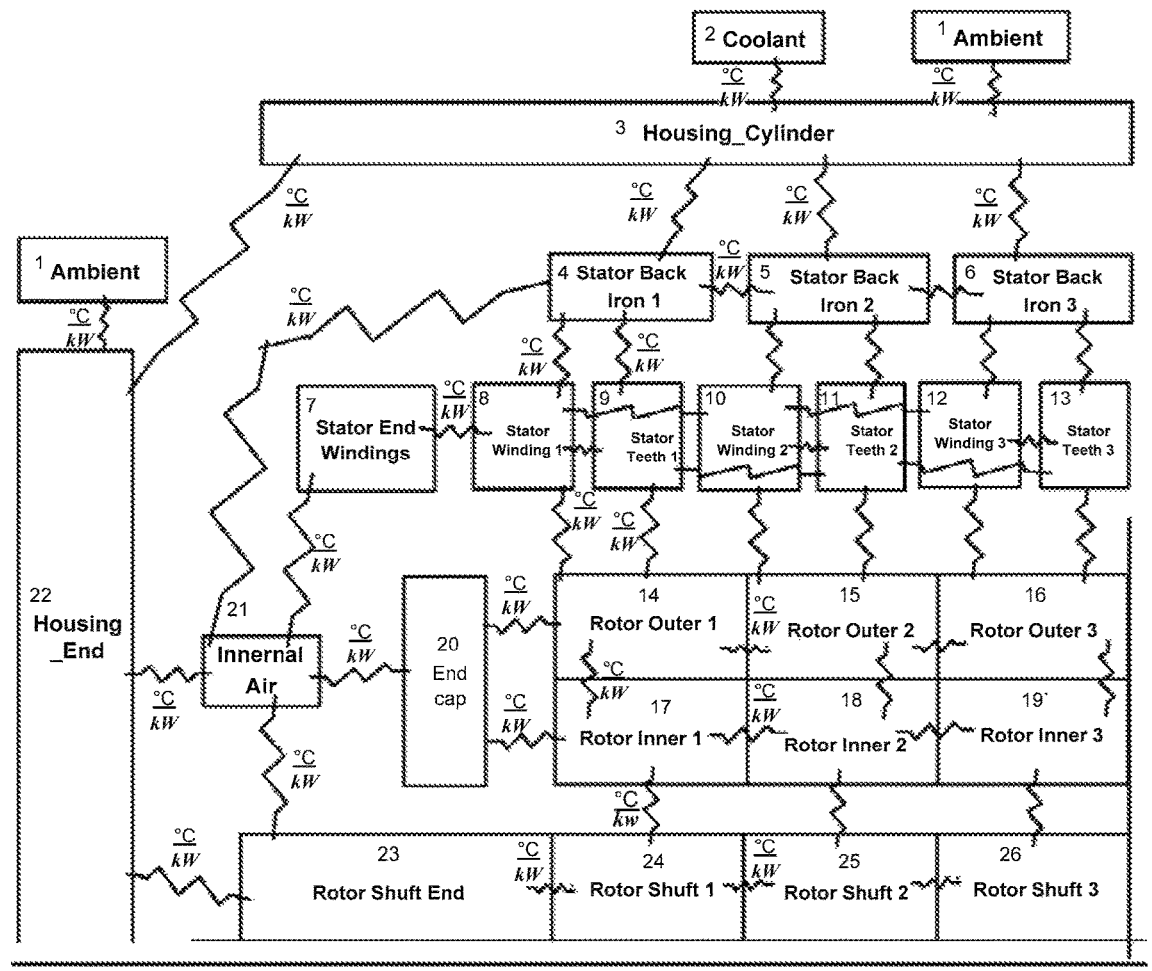
FIG. 10 is a schematic diagram of an LTPN semi-motor model according to an embodiment of the disclosure.

Sometimes when the non-symmetric effect is not critical or small, to reduce computation cost the full motor LPTN model can be simplified to half motor model (See FIG. 10 and Table 2 as an example). In the simplified model (FIG. 2), the stator end winding has only 1 node, but it can be represented to multiple-layers (multiple nodes) if needed. The theory and method for half model is similar and can be modified as needed.

TABLE 2

Nodes in the example Half-motor LPTN model of a PMSM

| | |
|---|---|
| 1. | Ambient |
| 2. | Coolant |
| 3. | Housing_Cylinder |
| 4. | Stator Back Iron 1 |
| 5. | Stator Back Iron 2 |
| 6. | Stator Back Iron 3 |
| 7. | Stator End Winding |
| 8. | Stator Winding 1 |
| 9. | StatorTeeth 1 |
| 10. | Stator Winding 2 |
| 11. | Stator Teeth 2 |
| 12. | Stator Winding 3 |
| 13. | Stator Teeth 3 |
| 14. | Rotor Outer 1 |
| 15. | Rotor Outer 2 |
| 16. | Rotor Outer 3 |
| 17. | Rotor Inner 1 |
| 18. | Rotor Inner 2 |
| 19. | Rotor Inner 3 |
| 20. | End Cap |
| 21. | Internal Air |
| 22. | Housing End |
| 23. | Rotor Shaft End |
| 24. | Rotor Inner 1 |
| 25. | Rotor Inner 2 |
| 26. | Rotor Inner 3 |

The LPTN model mentioned above is a steady model. In order to obtain the temperature at any time t, the following transient model may be adopted.

The transient LPTN model can be created by extending the steady state LPTN model. To create transient model, thermal capacitance of each node can be added to in the steady state model. However, accurate estimate the thermal capacitance may be difficult, due to material property and complex geometry, complex thermal interface, etc. Alternatively, the effective thermal capacitance at critical locations may also be measured/estimated by curve fitting the dynamic temperature change for the locations of interest through experiments.

For transient LPTN model, the thermodynamic equation in Matrix form is below.

$$[C]d[T]/dt + [G][T] = [P] \quad (11)$$

$$[G] = \begin{bmatrix} \sum_{i=1}^{\xi} \frac{1}{R_{1,i}} & -\frac{1}{R_{1,2}} & \cdots & -\frac{1}{R_{1,\xi}} \\ -\frac{1}{R_{2,1}} & \sum_{i=1}^{\xi} \frac{1}{R_{2,i}} & \cdots & -\frac{1}{R_{2,\xi}} \\ \cdots & \cdots & \cdots & \cdots \\ -\frac{1}{R_{\xi,1}} & -\frac{1}{R_{\xi,2}} & \cdots & \sum_{i=1}^{\xi} \frac{1}{R_{\xi,i}} \end{bmatrix} \quad (12)$$

For each node, C is ρp Vp cp, [G] is thermal conductance matrix, [P] is heat loss vector, [C] is thermal capacitance matrix, [T] is temperature vector, ξ is number of node, $R_{i,j}$ is the thermal resistance between node i and j. ρp Vp cp are density, volume and specific heat of the node respectively.

Solution to the above equation is:

$$[T] = e^{[A]\tau}[T_0] + \int_0^\tau e^{\tau-t}[B][P]dt \quad (13)$$

where $[A]=-[C]^{-1}[G]$, $[B]=[C]^{-1}$, $T_0$ is initial temperature vector, t is time variable.

The problem can then be solved with MATLAB for any future time τ. So the transient temperature field can be solved.

The method described above is a one-way electromagnetic-thermal coupled simulation, i.e., conducting the electro-magnetic simulation first to calculate the heat loss (heat generation), followed by LPTN modeling using the heat loss as input. To further improve its accuracy, we can improve the model and make it two-way coupling. For example, with 1st time LPTN modeling, the temperature of critical components is calculated. Then the material properties in the electromagnetic simulation can be updated, and the electromagnetic simulation can be rerun for a 2nd time to get more accurate heat loss value. Then we can rerun LPTN to get more accurate temperature field. The sequential coupling can be done for a few iterations until convergence. With two-way coupling, the final temperature field prediction will be more accurate. However, this method requires large amount of calculation, such as FEA based electro-magnetic, and may/be computational expensive and slow.

Another way of electromagnetic-thermal coupling would be the following: the electromagnetic simulations at different temperature are done first field (i.e., using temperature dependent material property), and the predicted heat loss results at different conditions are saved as a database. Then we presume a certain (reasonable) initial temperature field and obtain an initial heat loss from the database. Then we use this heat loss to perform LPTN modeling and generate another temperature field. The 2nd temperature field is compared with the initial temperature field. Then we use the 2nd temperature field and find the heat loss from the database and use it as input for another LPTN modeling. We can repeat this iteration until the temperate field converge. This is also a way of modeling and coupling to predict the motor temperature more accurately. This method uses saved precalculated heat loss database at different temperature conditions, and thus does not need online loss computation. It is therefore faster.

These two coupling methods are just examples. There may be other ways of electromagnetic coupling to calculate the motor temperature field more accurately.

The model can be used in a real vehicle for model-based control. With the model, the physical temperature sensors are eliminated, any temperature can be precisely predicted by this model. Therefore it can predict the motor's conditions, overheating risk, performance, giving alarm/warning, giving maintenance reminder, etc., be used to control the vehicle.

With little change, the LPTN model can be modified to simulate other types of motors, such as induction motor, switched reluctance motor, DC motor, etc. In the example, we just use a PMSM motor as an example.

After the results of the temperature estimation are obtained, the results may be output to the vehicle's model control system. The results may be compared with control limits in motor control system. If the prediction results are out of limits or have over-heating risk, a signal may be generated to increase coolant flow or reduce coolant temperature to cool motor. If the coolant flow cannot go higher or the temperature is close to the safety limit, the control logic can also reduce motor torque or power to avoid motor damage due to over heating. The driver may also be warned of the situation to prevent damage of the motor.

By adopting the solution in the embodiments of the present disclosure, the following benefits can be achieved.

The solution can predict motor temperature including rotor temperature accurately and fast, which allows real-time temperature monitoring/warning, and prevent magnet demagnetization and insulation damage. With accurate temperature prediction, customer can run the car at higher thermal load with high confidence. Thus, the car may be pushed to the limit so that the same vehicle can have higher performance (power or torque).

With the new method, no temperature sensor or no special measurement method is needed in the electric motor. This may reduce the vehicle cost for customer.

The method can predict temperature at all critical locations, which is more desirable than the existing method which typically measures temperature at only a few locations inside the motor. So it can protect the motor better.

The serial numbers of the embodiments of the disclosure are only used for descriptions, and do not represent the preference of the embodiments.

If being implemented in a form of software function unit and sold or used as an independent product, the integrated unit in the embodiments may also be stored in a computer-readable storage medium. Based on such an understanding, the essence of the technical solutions of the disclosure or parts making constructions to the conventional art may be embodied in a form of a software product. The computer software product is stored in a storage medium, including a plurality of instructions used to enable one or more terminal devices (which may be a PC computer, a server or a network device, etc.) to execute the method in each embodiment of the disclosure.

In the above embodiments of the disclosure, descriptions of each embodiment are emphasized respectively, and parts which are not elaborated in detail in a certain embodiment may refer to relevant descriptions of other embodiments.

In some embodiments provided by the disclosure, it will be appreciated that the disclosed client may be implemented in other modes, wherein the apparatus embodiment described above is only schematic. For example, division of the units may be division of logical functions, and there may be additional division modes during actual implementation.

For example, a plurality of units or components may be combined or integrated to another system, or some features may be omitted or may be not executed. In addition, displayed or discussed mutual coupling or direct coupling or communication connection may be performed via some interfaces, and indirect coupling or communication connection between units or modules may be in an electrical form or other forms.

The units that are described as separate components may be or may not be physically separated, and the components displayed as units may be or may not be physical units. That is, the units or components may be located at one place or scattered on several network units. Some or all of the units may be selected according to actual needs to implement the solutions in the embodiments of the disclosure.

In addition, all function units in each embodiment of the disclosure may be integrated into a processing unit, or exist as independent, physical units, or two or more units may be integrated into one unit. The integrated units may be implemented by using hardware, or by using the form of software function units.

The above are only preferred implementation modes of the disclosure. It should be pointed out that those of ordinary skill in the art may also make some improvements and modifications without departing from the principle of the disclosure. These improvements and modifications should fall within the scope of protection of the disclosure.

What is claimed is:

1. A method for determining motor temperature, comprising the following operations performed by a computing device in communication with a vehicle having a motor:
receiving or reading input parameters from the vehicle, wherein the input parameters comprise: a rotor speed of the motor and a torque of the motor;
obtaining an electromagnetic loss of each node in $\xi$ nodes under the rotor speed of the motor and the torque of the motor, wherein the $\xi$ nodes are nodes acquired by decomposing components of the motor, the $\xi$ is a natural number greater than 1, and each of at least one component in the components of the motor is decomposed into multiple nodes in the $\xi$ nodes;
obtaining a thermal resistance between every two nodes in the $\xi$ nodes;
determining a temperature of the motor based on the electromagnetic loss of the each node in the $\xi$ nodes and the thermal resistance between the every two nodes in the $\xi$ nodes; and
outputting the determined temperature of the motor to a motor control system of the vehicle,
wherein the at least one component comprises an end winding of the motor, before obtaining the electromagnetic loss of the each node in the $\xi$ nodes under the rotor speed of the motor and the torque of the motor, further comprising: decomposing the end winding into multiple concentric annular layers, each of the multiple concentric annular layers corresponding to one of the multiple nodes and being connected with a slot winding of the motor.

2. The method as claimed in claim 1, wherein heat conductivity coefficients among the multiple concentric annular layers are different from heat conductivity coefficients between the multiple concentric annular layers and the slot winding.

3. The method as claimed in claim 1, wherein obtaining the electromagnetic loss of the each node in the $\xi$ nodes acquired by decomposing the components of the motor comprises:

performing the following acts on each of the multiple concentric annular layers of the end winding, the each of the multiple concentric annular layers being called as a current concentric annular layer when the following acts are performed: obtaining a proportion of a volume of copper wires in the current concentric annular layer of the end winding to a total volume of copper wires in the end winding; and obtaining an electromagnetic loss of a node corresponding to the current concentric annular layer of the end winding according to the proportion.

4. The method as claimed in claim 1, wherein obtaining the thermal resistance between the every two nodes in the ξ nodes comprises at least one of:
   obtaining a thermal resistance between two solid nodes in the ξ nodes based on a conduction thermal resistance calculation manner;
   obtaining a thermal resistance between a solid node and a gas node in the ξ nodes based on a convection thermal resistance calculation manner; and
   obtaining a thermal resistance between a solid node and a liquid node in the ξ nodes based on a convection thermal resistance calculation manner.

5. The method as claimed in claim 4, wherein the two solid nodes in the ξ nodes are a first node and a second node; and obtaining the thermal resistance between the two solid nodes in the ξ nodes based on the conduction thermal resistance calculation manner comprises:
   under a condition in which the first node and the second node are of the same material, calculating the thermal resistance $R_1$ between the two solid nodes in the ξ nodes based on one of the following formulae:
   for heat conduction through a flat wall, $$R_1 = L/(k \cdot A),$$

where the L is a distance between central points of the first node and the second node, the A is a heat-conduction area between the first node and the second node and the k is a heat conductivity coefficient of the material;
   for heat conduction through a cylindrical wall, $$R_1 = \ln(R\_out/R\_in)/(2 \cdot \pi \cdot k \cdot L),$$

where the L is thickness of the cylindrical wall, the k is a heat conductivity coefficient of the material, the R_out and R_in are respectively outer and inner radius of the cylindrical wall;
   or,
   under a condition in which the first node and the second node are of different material, calculating the thermal resistance $R_1$ between the two solid nodes in the ξ nodes based on one of the following formulae:
   for heat conduction through a flat wall, $$R_1 = L_1/(k_1 \cdot A) + L_2/(k_2 \cdot A) + R_3$$

where $R_3$ is a contact resistance between the first node and the second node, the $L_1$ is a distance between a central point of the first node and a boundary of the first node, the $L_2$ is a distance between a central point of the second node and a boundary of the second node, the A is a heat-conduction area between the first node and the second node, the $k_1$ is a heat conductivity coefficient of the material of the first node, and the $k_1$ is a heat conductivity coefficient of the material of the second node;
   for heat conduction through a cylindrical wall, $$R_1 = \ln(R\_out\_1/R\_in\_1)/(2\pi k_1 L_1) + \ln(R\_out\_2/R\_in\_2)/(2\pi k_2 L_2) + R'_3,$$

where $R_3$ is a contact resistance between the first node and the second node, the $L_1$ is thickness of the cylindrical wall of the first node, the $L_2$ is thickness of the cylindrical wall of the second node, the $k_1$ is a heat conductivity coefficient of the material of the first node, the $k_2$ is a heat conductivity coefficient of the material of the second node, the R_out_1 and R_in_1 are respectively outer and inner radius of the cylindrical wall of the first node, and the R_out_2 and R_in_2 are respectively outer and inner radius of the cylindrical wall of the second node.

6. The method as claimed in claim 5, wherein the contact resistance $R_3$ between the first node and the second node is calculated using the following formula:

$$R_3 = 1/(h_c \cdot A),$$

where the A is the heat-conduction area between the first node and the second node, and the $h_c$ is a heat conductivity coefficient.

7. The method as claimed in claim 5, wherein an air gap between a stator and a rotor of the motor is treated as a solid node with an enhanced thermal conductivity k_effective, where k_effective=k×Nu, $$Nu = \begin{cases} 1, & \text{if } Ta < 1700 \\ 0.064 Ta^{0.367}, & \text{if } 1700 < Ta < 10^4 \\ 0.205 Ta^{0.241}, & \text{if } 10^4 < Ta < 10^6 \end{cases}$$

$$Ta = R_e^2 \frac{\delta}{R_m}$$

$$R_e = \frac{V_r \delta}{v};$$

where the Ta is a Taylor number, the $R_e$ is a Reynolds number, the v is a kinematic viscosity, the $V_r$ is a linear velocity of a rotor outer surface, $V_r = R \cdot \omega$, where R is a radius of the rotor, ω is an angular speed, and the Rm is a mean radius defined as $$R_m = \frac{b}{\ln((R_i + b)/R_i)},$$

with $b = A/2\pi R_1$, where $R_1$ is an inner radius of an inner annulus.

8. The method as claimed in claim 4, wherein obtaining the thermal resistance between the solid node and the gas node or between the solid node and the liquid node in the ξ nodes based on the convection thermal resistance manner comprises:

$$R_2 = 1/(h \cdot A),$$

where h is a convective heat transfer coefficient and h=Nu·k/δ, the Nu is a Nusselt number, the k is a heat conductivity coefficient of gas or liquid, the δ is a characteristic length, and the A is a heat-conduction area between the solid node and the gas node or between the solid node and the liquid node.

9. The method as claimed in claim 8, wherein the Nusselt number corresponding to convection between a balance plate and internal air of the motor is as follows:

$$N_u = 0.355 Re_r^{0.5},$$

if $Re_r$ is less than $1.82 \times 10^5$, and the flow is laminar $$N_u = 0.015 Re_r^{0.8},$$

if $Re_r$ is higher than $2.82 \times 10^5$, and the flow is turbulent $$Re_r = \frac{\omega \cdot r^2}{v}$$

where the $Re_r$ is a Reynolds number, the w is an angular speed, the r is a radius of the balance plate and the v is a kinematic viscosity of the internal air.

10. The method as claimed in claim 1, wherein determining the temperature of the motor based on the electromagnetic loss of the each node in the ξ nodes and the thermal resistance between the every two nodes in the ξ nodes comprises:
calculating the temperature of the motor based on the following formula: $T = G^{-1} \cdot P$,
where the T is a ξ×1 steady-state temperature vector which comprises ξ elements respectively representing steady-state temperatures at the ξ nodes, the G is a ξ×ξ thermal conductance matrix, in which an element g(i,j) represents thermal conduction between an $i^{th}$ node and a $j^{th}$ node, and the g(i,j) is determined based on a thermal resistance between the $i^{th}$ node and the $j^{th}$ node, 1≤i≤ξ, 1≤j≤ξ; the $G^{-1}$ is an inverse matrix of the G; and the P is a ξ×1 heat loss vector which comprises ξ elements respectively representing electromagnetic losses at the ξ nodes.

11. The method as claimed in claim 1, wherein determining the temperature of the motor based on the electromagnetic loss of the each node in the ξ nodes and the thermal resistance between the every two nodes in the ξ nodes comprises:
calculating the temperature of the motor based on the following formula:

$$T_\tau = e^{A\tau} T_0 + \int_0^\tau e^{\tau-t} BP dt,$$

where the $T_\tau$ is a ξ×1 transient temperature vector which comprises ξ elements respectively representing transient temperatures at the ξ nodes when a time variable is τ; the $T_0$ is a ξ×1 initial temperature vector which comprises ξ elements respectively representing initial temperatures at the ξ nodes; $A = -C^{-1} \cdot G$, $B = C^{-1}$, the C is a ξ×ξ thermal capacitance matrix, the $C^{-1}$ represents an inverse matrix of the C, the G is a ξ×ξ thermal conductance matrix, in which an element g(i,j) represents thermal conduction between an $i^{th}$ node and a $j^{th}$ node, the g(i,j) is determined based on a thermal resistance between the $i^{th}$ node and the $j^{th}$ node, 1≤i≤ξ, 1≤j≤ξ; and the P is a ξ×1 heat loss vector which comprises ξ elements respectively representing electromagnetic losses at the ξ nodes.

12. The method as claimed in claim 1, wherein the temperature of the motor comprises temperatures at the ξ nodes, after determining the temperature of the motor based on the electromagnetic loss of the each node in the ξ nodes and the thermal resistance between the every two nodes in the ξ nodes, the method further comprises:
performing the following acts on each node in the ξ nodes so as to obtain an updated electromagnetic loss of the each node, the each node being called as a current node when the following acts are performed: obtaining a temperature of the current node in the determined temperature of the motor; and obtaining an updated electromagnetic loss of the current node corresponding to the temperature of the current node; and
determining the temperature of the motor based on the updated electromagnetic loss of the each node in the ξ nodes and the thermal resistance between the every two nodes in the ξ nodes.

13. The method as claimed in claim 1, before obtaining the electromagnetic loss of the each node in the ξ nodes acquired by decomposing the components of the motor, further comprising one of the followings:
decomposing all components of the motor into the ξ nodes based on a structure of the motor; and
decomposing components in a first portion of the motor into the ξ nodes based on the structure of the motor, wherein the motor comprises components of a second portion which are symmetrical or partially symmetrical to the components of the first portion.

14. A non-transitory storage medium, comprising a stored program, wherein the program is used for executing the method as claimed in claim 1.

15. An apparatus for determining motor temperature, wherein the apparatus is in communication with a vehicle having a motor and comprises a processor and a memory, wherein:
the memory is configured to store a computer executable instruction; and
the processor is configured to execute the computer executable instruction to:
receive or read input parameters from the vehicle, wherein the input parameters comprise: a rotor speed of the motor and a torque of the motor;
obtain an electromagnetic loss of each node in ξ nodes under the rotor speed of the motor and the torque of the motor, wherein the ξ nodes are nodes acquired by decomposing components of the motor, the ξ is a natural number greater than 1, and each of at least one component in the components of the motor is decomposed into multiple nodes in the ξ nodes;
obtain a thermal resistance between every two nodes in the ξ nodes;
determine a temperature of the motor based on the electromagnetic loss of the each node in the ξ nodes and the thermal resistance between the every two nodes in the ξ nodes; and
output the determined temperature of the motor to a motor control system of the vehicle,
wherein the at least one component comprises an end winding of the motor, the processor is further configured to execute the computer executable instruction to: before obtaining the electromagnetic loss of the each node in the ξ nodes under the rotor speed of the motor and the torque of the motor, decompose the end winding into multiple concentric annular layers, each of the multiple concentric annular layers corresponding to one of the multiple nodes and being connected with a slot winding of the motor.

16. The apparatus as claimed in claim 15, wherein obtaining the thermal resistance between the every two nodes in the $\xi$ nodes comprises at least one of:
- obtaining a thermal resistance between two solid nodes in the $\xi$ nodes based on a conduction thermal resistance calculation manner;
- obtaining a thermal resistance between a solid node and a gas node in the $\xi$ nodes based on a convection thermal resistance calculation manner; and
- obtaining a thermal resistance between a solid node and a liquid node in the $\xi$ nodes based on a convection thermal resistance calculation manner.

\* \* \* \* \*